(12) United States Patent
Wu

(10) Patent No.: US 6,943,534 B2
(45) Date of Patent: Sep. 13, 2005

(54) MULTIPURPOSE TRANSFORMING DEVICE

(75) Inventor: Jui Hsiung Wu, Taipei (TW)

(73) Assignee: Well Shin Technology Co., Ltd., Taipei (TW)

( * ) Notice: Subject to any disclaimer, the term of this patent is extended or adjusted under 35 U.S.C. 154(b) by 29 days.

(21) Appl. No.: 10/664,952

(22) Filed: Sep. 22, 2003

(65) Prior Publication Data

US 2005/0063206 A1 Mar. 24, 2005

(51) Int. Cl.$^7$ .......................... G05F 1/455; G05F 1/40
(52) U.S. Cl. ..................................... 323/241; 323/246
(58) Field of Search .............................. 323/234, 241, 323/246, 265, 266

(56) References Cited

U.S. PATENT DOCUMENTS

| | | | | |
|---|---|---|---|---|
| 5,550,459 A | * | 8/1996 | Laplace ...................... | 323/255 |
| 5,550,460 A | * | 8/1996 | Bellin et al. ................ | 323/255 |
| 5,596,263 A | * | 1/1997 | Zavis et al. ................. | 323/255 |
| 5,787,014 A | * | 7/1998 | Hall et al. ................... | 323/312 |
| 5,939,868 A | * | 8/1999 | Hall et al. ................... | 323/281 |
| 6,219,293 B1 | * | 4/2001 | Butler et al. ................ | 365/226 |

* cited by examiner

*Primary Examiner*—Bao Q. Vu
(74) *Attorney, Agent, or Firm*—Rosenberg, Klein & Lee

(57) ABSTRACT

A multipurpose transforming device includes a power supply device that has a power import device and a power output device respectively connected with two side of the power supply device. The power import device and the power output device have connectors used for connected with different types of plugs and outlets. The power output device has at least two output lines so as to supply power to several electric device loads. The power supply device includes an AC supply unit, a voltage-regulating unit, a galvanometry unit, a memory and a microprocessor. The AC supply unit transforms alternating current into direct current. The voltage-regulating unit regulates outputting voltage from zero to rated load according to the microprocessor control. The galvanometry unit samples real-time load current and transmits the sampling value to the microprocessor. A memory stores some common rated loads so that the microprocessor compares with sampling value until two groups of value matches. Finally the microprocessor commands the voltage-regulating unit to retain output at the value.

4 Claims, 4 Drawing Sheets

MULTIPURPOSE TRANSFORMING DEVICE

FIELD OF THE INVENTION

The present invention relates generally to a transforming device supplying power to electric device loads and more particularly to a transforming device which can automatically check and measure outputting voltage, and freely connected with different specification plugs and outlets.

BACKGROUND OF THE INVENTION

Direct Current (DC) Power Supply devices are broadly used in various electric equipment such as wireless phone, walkman, radio receiver, modem, charger, Liquid-crystal display (LCD) and so on, and all these electric equipment need DC power supply (DC transformer) supplying power.

Conventional DC transformer is just a simple AC (alternating current)—DC transforming circuit, which is connected with an AC power outlet and supplies power to electric device loads with a constant voltage. Such transformer can supply power to only one electric device load. However, each electric device load has its own power which is different from other type, so that a user must equip several DC transformer if he has more than one electric device load, and the user must remember corresponding relationship between electric device loads and DC transformers. It is difficult to use especially for those who are not familiar with electric knowledge. And the electric device loads will be soon damaged if the user connects a DC transformer with a unfit device.

When an electric device load supplied by DC transformer is damaged or abandoned, the corresponding DC transformer will be abandoned too. A lot of such abandoned DC transformers produce serious environmental problem.

Besides, manufacturers which produce DC transformers or electric device loads must manufacture a lot of different DC transformers according to different electric device load specifications. It is difficult for manufacturer to save cost and working time.

At present, there is a charger equipped with a simply commutating and transforming circuit which can supply power at different voltage under user's handle. Such design needs a user to select a voltage value before connecting the charger to an electric device load, it is ineluctable to damage the electric device loads while user select a wrong voltage value.

Moreover, many countries have their own design specification in electrical outlets and plugs, users especially to those who often travel abroad meet the question that his plug can not fit for the outlet supplied by hotel, and the like. Such as, he has a notebook equipped with a two pin plug but the outlet has three hole, and he can not use his notebook finally.

SUMMARY OF THE INVENTION

An object of the present invention is to provide a multi-purpose transforming device so that a user can freely using his electric device loads wherever he goes.

In order to achieve the above object, the present invention essentially provides a multipurpose transforming device comprising a power supply device; a power import device which has a first connector joined with the power supply device at one end and a second connector at the other end used for connecting with some import connectors such as plugs; a power output device which has a third connecter joined with the power supply device at one end and at least two output lines at the other end for connecting with more than one electric device load. The output line has a forth connector to connect with various output connector for different electric device load.

Another object of the present invention is to provide a multipurpose transforming device which comprises an AC supply unit, a voltage-regulating unit, a galvanometry unit, a memory and a microprocessor. The AC supply unit is used for transforming alternating current into direct current. The voltage-regulating unit regulates outputting voltage from zero to rated load according to the microprocessor control. The galvanometry unit samples real-time load current and transmits the sampling value to the microprocessor. A memory stores some common rated loads so that the microprocessor compares with sampling value until two groups of value matched; finally the microprocessor commands the voltage-regulating unit to retain output at this value.

Instead of manual operation of setting outputting voltage value, the present invention can automatically regulates output voltage value in different values so as to supply power to the electric device loads required different voltages. Such arrangement avoids lots of abandoned transforming devices damaging environment.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF PREFERRED EMBODIMENTS OF THE INVENTION

Figure 1:
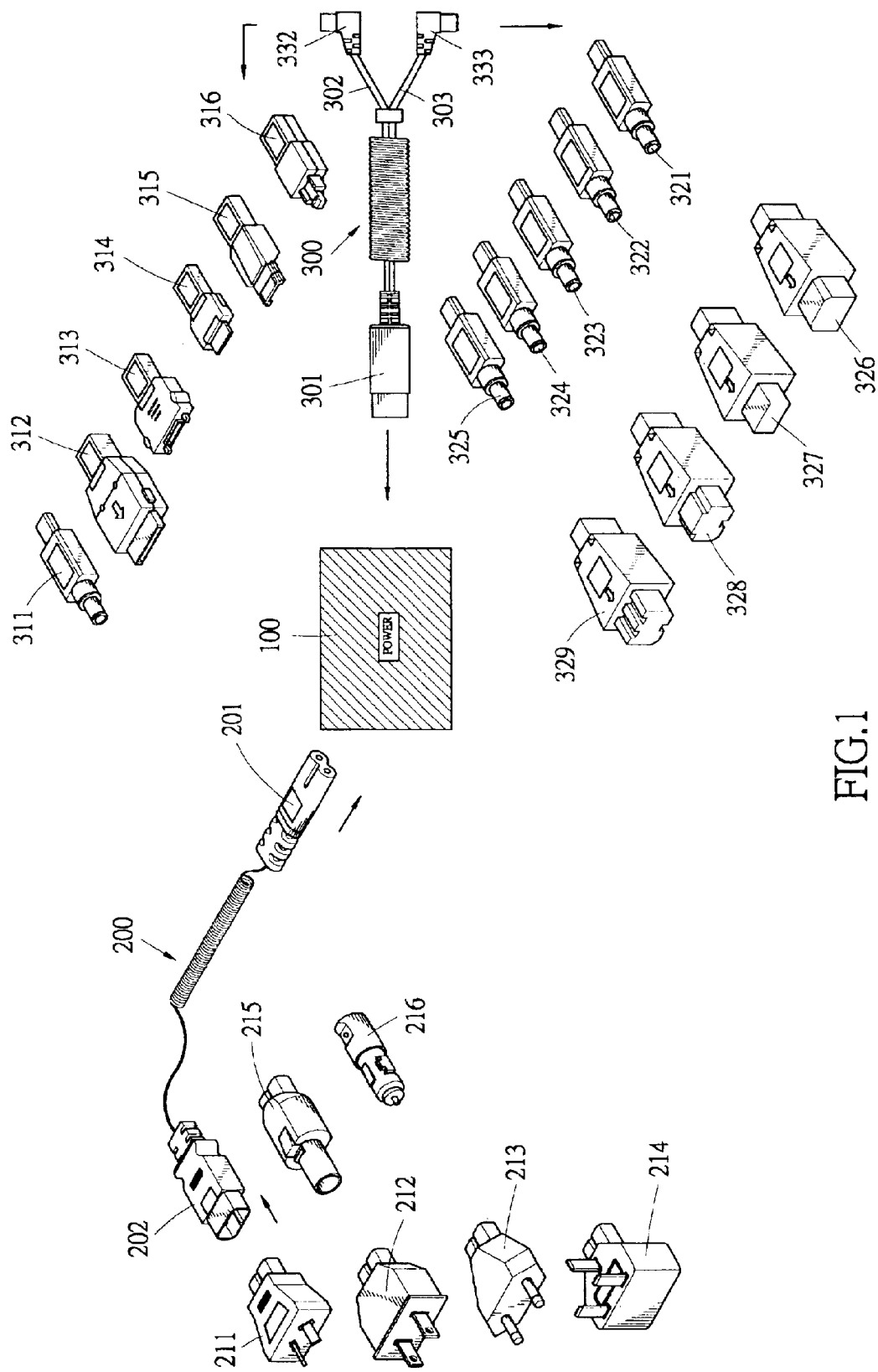
FIG. 1 shows a relief perspective view of a multipurpose transforming device according to an embodiment of the present invention.

Please refer to FIG. 1, the present invention comprises a power supply device 100, a power import device 200 and a power output device 300 respectively connects with two side of the power supply device 100. The power import device 200 has a first connector 201 and a second connector 202 on its two ends. The first connector 201 is joined with the power supply device 100, and the second connector 202 is used for connecting with a import connecter which has a different designed specification, such as plug 211, 212, 213, 214, 215 or 216 and so on. Because different country may have her own design specification in plugs, and AC plug and DC plug usually are different with each other, the present invention supplies the second connector 202 used for connecting various plug 211, 212, 213, 214, 215 or 216 to accept power import on diverse condition. The power output device 300 has a third connecter 301 joined with the power supply device 100 on its one end. The other end of the power output device 300 has at least two output lines 302 and 303. Each of the output lines 302 and 303 respectively has a fourth connector 332, 333 that is used for connecting with some output connectors such as 311–316 and 321–329.

Therefore, the present invention can accept alternating current or direct current importing and output power as demand after transforming. The present invention provides with the second connector 202 which can link with various plug, so that users conveniently use electric device loads in diverse condition. Furthermore, the present invention provides with several output lines 302, 303, such design can utilize one transforming equipment of the power supply device to output several load currents, for example, wireless phone and notebook can be used at the same time. There are only two output lines shown in the FIG. 1, but the number of the output lines can be increased as demand. Besides, considering users may have several connectors in different specification, the present invention supplies the fourth connectors 332, 333 used to connect with corresponding output connectors 311–316 or 321–329.

Since conventional power supply devices are able to transform alternating current to direct current, and to accept power importing in different voltage. Such designs have already disclosed and these are not the characters of the present invention, no further description will be described thereinafter.

Figure 2:
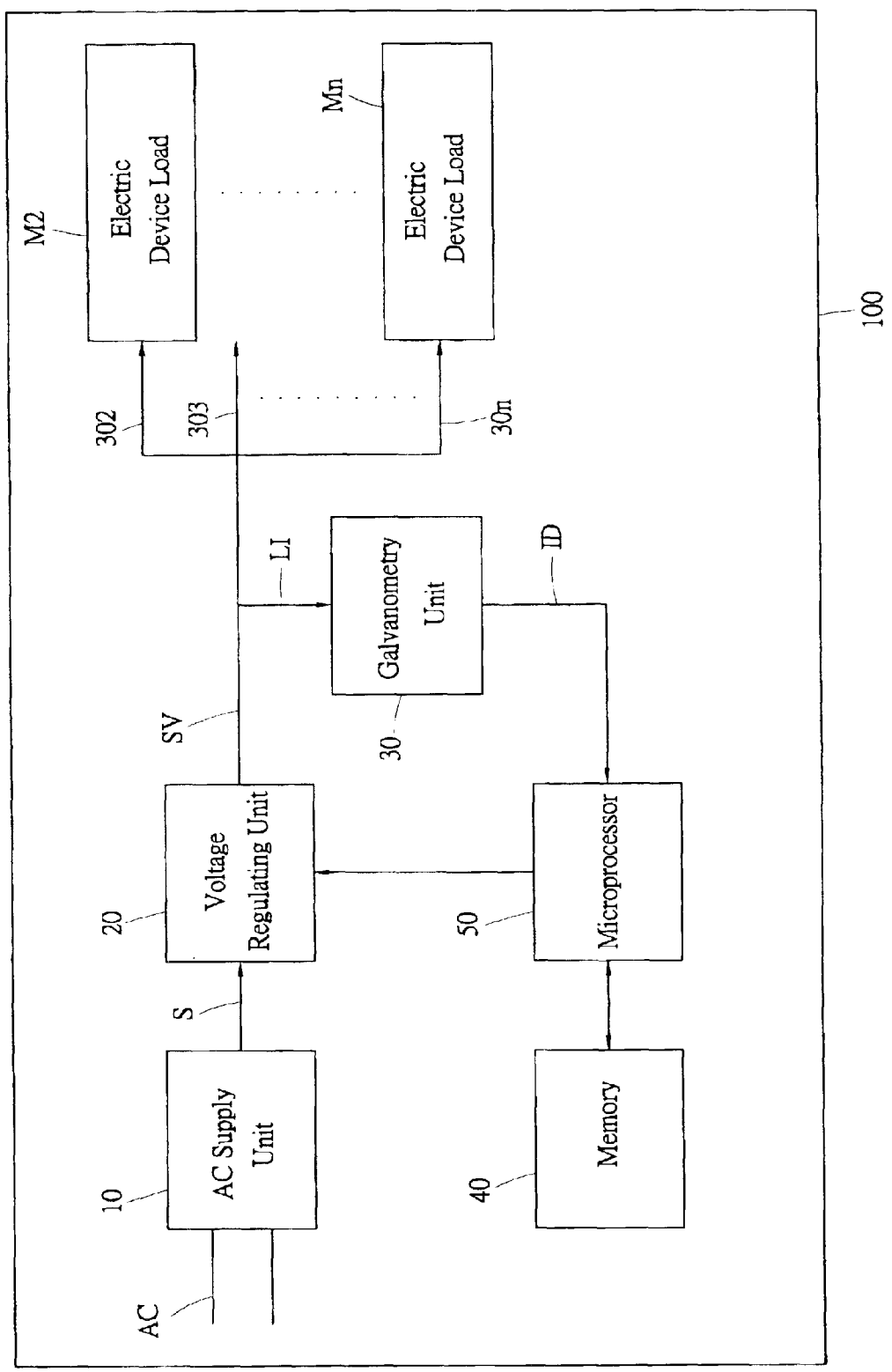
FIG. 2 is a block diagram of the first embodiment of the present invention.

Please refer to FIG. 2 which shows a first embodiment of the present invention. The power supply device 100 comprises an AC supply unit 10, a voltage-regulating unit 20, a galvanometry unit 30, a memory 40, a microprocessor 50 and some output lines 302–30n. This embodiment will describe the invention with alternating current importing.

The AC supply unit 10 transforms importing alternating current into direct current. According to the microprocessor 50 controlling, the voltage-regulating unit 20 accepts the direct current from the AC supply unit 10 and supplies voltage SV after regulating. The voltage-regulating unit 20 increases one unit testing voltage value from zero to rated load per unit time, such as to the electric device loads M2–Mn (the voltage values supplied to the electric device loads M2–Mn may be different). The unit testing voltage value can be set freely through the microprocessor 50, for example, increasing 0.5 volt per 0.1 millisecond (ms).

After regulated by the voltage-regulating unit 20, the power are transmitted to the electric device loads M2–Mn through the output lines 302–30n. Besides, in terms of different specification of the plugs of the electric device loads, the output lines 302–30n can be connected with different connectors for different electric device loads.

The galvanometry unit 30 samples a load current LI from the circuit between the voltage-regulating unit 20 and electric device loads M (the M including M2 to Mn), then converts the sampling LI into a current value ID and transmits it to the microprocessor 50. The time interval between two sampling is the same as the unit time that the voltage-regulating unit 20 regulates output voltage SV. For example, while voltage-regulating unit 20 increases 0.5 volt per 0.1 millisecond, the galvanometry unit 30 samples a load current value per 0.1 millisecond.

The memory 40 stores in advance some common rated voltage values and rated current values of electric device loads to form a database.

The microprocessor 50 controls the voltage-regulating unit 20 to regulate each output voltage values supplied to the electric device loads M2–Mn (each output voltage values may be different with each other). The microprocessor 50 also control the voltage-regulating unit 20 increasing a unit testing voltage value per unit time in each output line. Furthermore, the microprocessor 50 accepts current values ID from the galvanometry unit 30 and compares the ID and the SV from the voltage-regulating unit 20 with the rated current and rated voltage stored in the database of the memory 40. When the ID value and the SV value fit for a set of rated current and rated voltage stored in he database of the memory 40, the microprocessor 50 fixes the ID value and the SV value supplied to the electric device loads M immediately and makes the ID value and the SV value as the required value of electric device loads. Then, the microprocessor 50 commands the voltage-regulating unit 20 to stop regulating and to retain output at this value in this output line. At same time, the microprocessor 50 stops the comparing action too.

Generally, the microprocessor 50 commands the voltage-regulating unit 20 regulating each output voltage SV supplied to electric device loads M2–Mn in terms of the rated currents and the rated voltages stored in the memory 40, and the microprocessor 50 will accept current values ID from said galvanometry unit 30 and compare the ID and SV from the voltage-regulating unit 20 with the rated currents and the rated voltages stored in the memory 40 until the output voltage fitting for the rated voltage of the electric device loads M required. Finally, according to the microprocessor 50 controls, the voltage-regulating unit 20 will retain output at this value to supply suitable power to the electric device loads.

Figure 3:
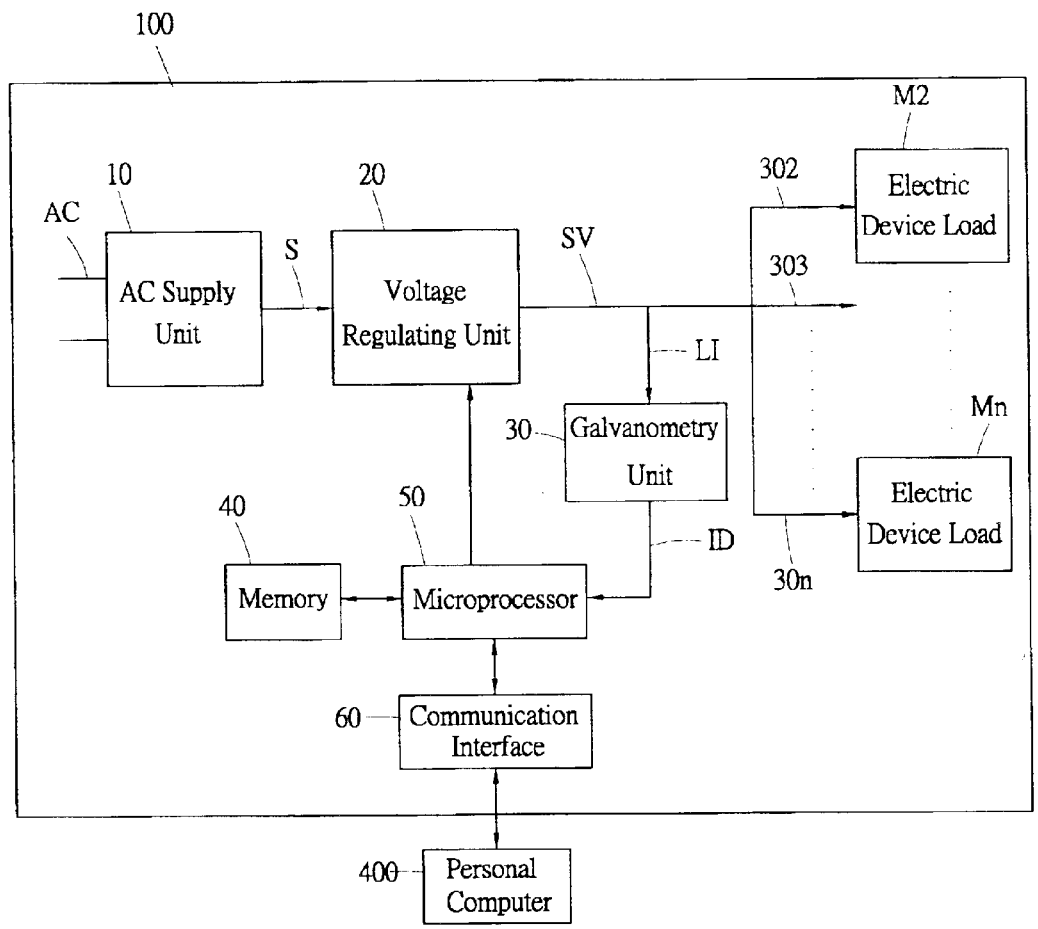
FIG. 3 is a block diagram of the second embodiment of the present invention.

FIG. 3 shows the second embodiment of the present invention. A communication interface 60 links with the microprocessor 50 and provides the processor 50 with an Import/Output (I/O) interface used for communicating with a Personal Computer (PC) or a parameter database stored some parameters of the electric device loads. The parameter database includes rated current, rated voltage and so on. The microprocessor 50 gets the rated currents and the rated voltages through the communication interface 60, and then stores them into the memory 40 as a comparing reference. In this embodiment, the communication interface is Universal Serial Bus (USB), but designer may freely select any other form of the communication interface. Besides, the enable operation of the communication interface 60 can be performed whether the voltage-regulating unit 20 connecting with the electric device loads M or not.

Figure 4:
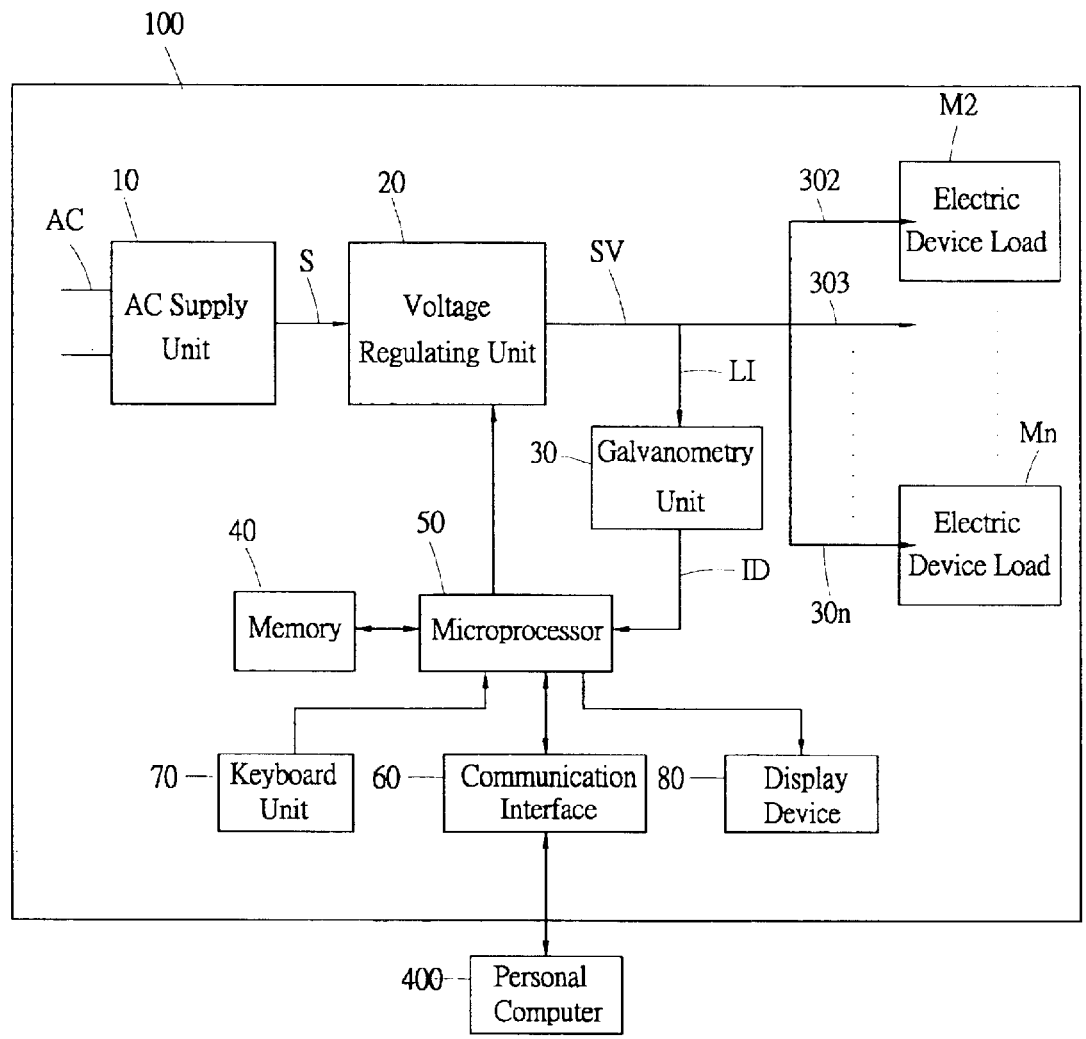
FIG. 4 is a block diagram of the third embodiment of the present invention.

Please refer to FIG. 4 which shows the third embodiment of the present invention. A keyboard unit 70 and a display device 80 are linked with the microprocessor. A user may input some instructions through the keyboard unit 70 so that the microprocessor 50 performs some operation such as measuring and analyzing the output voltage, storing the analyzing results, reading and writing operating through the communication interface 60 and so on. The states and results of these operation can be displayed on the display device 80. Such design will help users to see the operating course and results directly. In this embodiment, the display device is Liquid Crystal Display (LCD), but designer may freely select any other form of said display device. Therefore, the other display should be included in the claimed category such as LED display array etc.

This invention has been described with reference to specific embodiments, this description is not to be construed in a limiting sense. For example, those skilled in the art will recognize modifications and alterations that may be made to the embodiments illustrated herein. However, it is contemplated that such modifications can be made without departing the scope and spirit of the invention as defined in the following claims.

What is claimed is:

1. A multipurpose transforming device comprising:
    a power supply device having a power import device for accepting external AC power and a power output device for supplying DC power to an electric device load, the power supply device including:

an AC supply unit coupled to the power import device for transforming alternating current from an external source into direct current and outputting the direct current;

a voltage-regulating unit having a first input coupled to an output of the AC supply unit for accepting the direct current and supplying a regulated voltage to the electric device load, the voltage-regulating unit having an output coupled to the power output device;

a galvanometry unit coupled to the output of the voltage-regulating unit for sampling a load current from the voltage-regulating unit, the galvanometry unit converting the sampled load current into a current value for coupling to an output thereof;

a microprocessor coupled to a memory and having a first output coupled to a second input of the voltage-regulating unit for controlling the valve of the regulated voltage, the microprocessor having an input coupled to the output of the galvanometry unit for receiving current values therefrom at uniform time intervals, the microprocessor controlling the voltage-regulating unit to output a test voltage supplied to the electric device load in discrete steps from zero to a final voltage value, each step being at the uniform time intervals, the final voltage value being established by the microprocessor responsive to a match between the current values and the test voltage with voltage and current load data pre-stored in the memory, the voltage-regulating unit supplying the regulated voltage equal to the final voltage value to the electric device load.

2. The multipurpose transforming device as claimed in claim 1, further comprising a communication interface linked with the microprocessor so that the processor communicates with a Personal Computer via the communication interface.

3. The multipurpose transforming device as claimed in claim 1, further comprising a keyboard unit connected to the microprocessor for a user's input of instructions to the microprocessor.

4. The multipurpose transforming device as claimed in claim 1, further comprising a display device connected with the microprocessor for showing a state and results of operation of the microprocessor.

* * * * *